(12) United States Patent
Müller et al.

(10) Patent No.: US 9,452,105 B2
(45) Date of Patent: Sep. 27, 2016

(54) DOSING DISPENSER

(71) Applicant: Bayer Intellectual Property GmbH, Monheim (DE)

(72) Inventors: Uwe Müller, Leverkusen (DE); Sölen Siemers, Wuppertal (DE); Wolfgang Wiehl, Köln (DE); Sabine Göttke, Lohne (DE)

(73) Assignee: BAYER INTELLECTUAL PROPERTY GMBH, Monheim (DE)

(*) Notice: Subject to any disclaimer, the term of this patent is extended or adjusted under 35 U.S.C. 154(b) by 16 days.

(21) Appl. No.: 14/385,745

(22) PCT Filed: Mar. 15, 2013

(86) PCT No.: PCT/EP2013/055420
§ 371 (c)(1),
(2) Date: Sep. 16, 2014

(87) PCT Pub. No.: WO2013/139707
PCT Pub. Date: Sep. 26, 2013

(65) Prior Publication Data
US 2015/0041491 A1   Feb. 12, 2015

(30) Foreign Application Priority Data
Mar. 20, 2012 (EP) .................................. 12160378

(51) Int. Cl.
*G01F 11/10* (2006.01)
*A61J 1/03* (2006.01)
*B65D 83/06* (2006.01)
*G01F 11/18* (2006.01)

(52) U.S. Cl.
CPC .................. *A61J 1/03* (2013.01); *B65D 83/06* (2013.01); *G01F 11/18* (2013.01)

(58) Field of Classification Search
CPC .......... A61J 1/03; B65D 83/06; G01F 11/18; G01F 11/00; G01F 11/10; G01F 11/14; G01F 11/003; G01F 13/001

USPC .................. 222/361, 363, 365, 366, 21, 344
See application file for complete search history.

(56) References Cited

U.S. PATENT DOCUMENTS

| | | | | |
|---|---|---|---|---|
| 998,389 A * | 7/1911 | Penick | ............... | B67D 3/0029 222/185.1 |
| 1,189,578 A * | 7/1916 | Kelly | ................. | B65D 88/68 222/231 |
| 1,233,791 A * | 7/1917 | Kaiser | ................. | G01F 11/18 222/308 |
| 1,523,880 A * | 1/1925 | Kiehl | .................... | F04B 7/04 222/361 |
| 1,974,789 A * | 9/1934 | Angell | ................ | B65G 53/4683 110/109 |
| 2,122,216 A * | 6/1938 | Seawell | ............. | A47G 19/34 222/308 |
| 3,159,317 A * | 12/1964 | Mini | .................... | A47K 5/1211 222/341 |
| 3,907,173 A * | 9/1975 | Lind | ..................... | G01F 11/22 137/99.5 |
| 4,149,658 A * | 4/1979 | Teufel | ................ | G01F 11/18 222/267 |
| 5,307,841 A * | 5/1994 | Condon | .............. | F16L 55/132 138/89 |
| 5,435,461 A * | 7/1995 | Smith | ................. | G01F 11/14 222/209 |

(Continued)

FOREIGN PATENT DOCUMENTS

EP          396990 A2   11/1990
WO     2011056552 A2    5/2011

*Primary Examiner* — J. Casimer Jacyna
*Assistant Examiner* — Benjamin R Shaw
(74) *Attorney, Agent, or Firm* — Yonggang Ji

(57) ABSTRACT

The invention relates to a dosing dispenser having a dosing piston, for dosing formulations of a drug or nutritional supplement in the form of a free-flowing bulk material having a particle diameter in the range of 100-1000 μm.

20 Claims, 4 Drawing Sheets

(56) References Cited

U.S. PATENT DOCUMENTS

Figure 1:
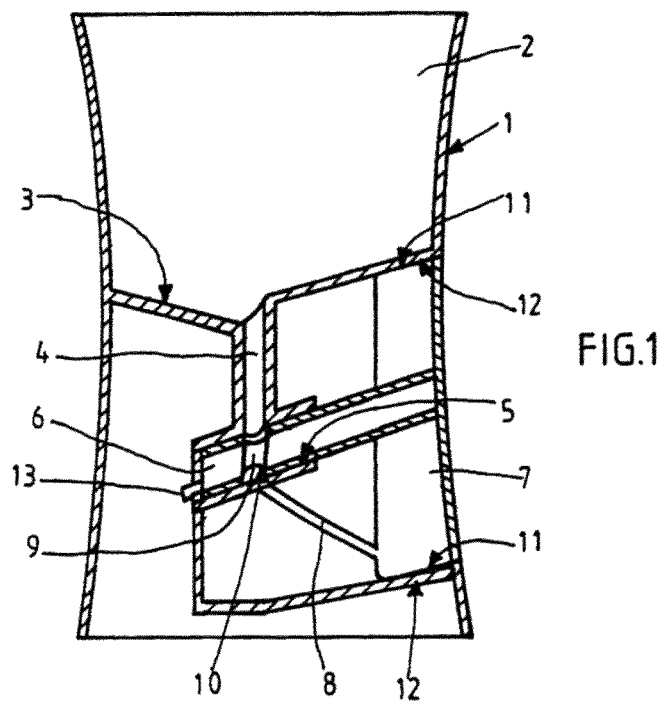

| | | | |
|---|---|---|---|
| 6,234,361 B1 * | 5/2001 | Bloom | B05B 11/3011 222/1 |
| 6,484,906 B2 * | 11/2002 | Bonningue | G01F 11/04 222/207 |
| 6,811,061 B2 * | 11/2004 | Tuvim | G01F 11/18 222/336 |
| 6,962,274 B1 | 11/2005 | Sherman | |
| 8,757,451 B2 * | 6/2014 | Schroedter | G01F 11/24 222/153.13 |
| 2003/0164386 A1 * | 9/2003 | Connelly | G01F 11/16 222/361 |
| 2008/0302826 A1 | 12/2008 | Rich, Jr. | |
| 2010/0059542 A1 * | 3/2010 | Lowther | G01F 11/18 222/1 |
| 2011/0284123 A1 | 11/2011 | Bouix et al. | |

* cited by examiner

DOSING DISPENSER

The invention relates to a dosing dispenser having a dosing piston, for dosing formulations of a drug or nutritional supplement in the form of a free-flowing bulk material having a particle diameter in the range of 100-1000 µm.

A dosing dispenser for powder is known from EP 0 396 990 A2. The dosing dispenser of EP 0 396 990 A2 is composed of a housing having a storage chamber, the base of which displays an outlet opening which opens out into a guide sleeve for a slide with a pressure plate and with a return spring, wherein the slide, in its rest position, displays a duct which is located below the outlet opening and the ejection opening of which, in the rest position, is covered by the guide sleeve. In the rest position, the dosing chamber is filled from the storage chamber via the outlet opening. Upon actuating the pressure plate of the slide, the outlet opening is closed and the slide is pushed into the ejection position, such that the duct is pushed beyond the guide sleeve and, on account thereof, is emptied. The dosing dispenser of EP 0 396 990 A2 is illustrated in detail in FIGS. 1, 2. It is composed of a housing 1 having a storage chamber 2, the base 3 of which has an outlet opening 4 which opens out into a guide sleeve 5 for a slide 6 with a pressure plate 7 and a return spring 8. The base 3, on all sides, is inclined towards the ejection point. The guide sleeve 5 has a circular cross section. The cross section of the slide 6, in its upper region, is adapted to the cross-sectional shape of the guide sleeve 5, such that, in this region, a certain sealing effect exists against an intrusion of powder. The slide 6 is traversed by a duct 9 which, in the rest position of the slide 6, is flush with the outlet opening 4. The volume of this duct 9 corresponds to the amount of powder which can be dosed with one ejection. Below the outlet opening 4 the guide sleeve 5 serves as a sealing cover for the ejection opening 10 of the duct 9 and, in the direction of the ejection position, reaches so far that the duct 9 does not connect the storage chamber 2 to the free space in any position. Both the housing 1 and the slide 6 are manufactured from plastic in an injection-moulding process. Exact dosing is achieved in that when the slide transitions from the rest position (filling position) into the ejection position, the duct, for a moment, is neither connected to the outlet opening of the base nor to the free space.

The described dosing dispenser according to EP 0 396 990 A2 has been designed for powder. Powder particles typically have diameters which are smaller than 50 µm. The known dosing dispenser, however, is disadvantageous when dosing free-flowing bulk materials having a particular diameter in the range of 100-1000 µm, in particular in the case of spherical particles. By way of adapting the cross section of the slide and the guide sleeve an attempt is indeed made to avoid that particles make their way between the slide and the guide sleeve, but this is only viewed as being problematic in relation to any potential congestion or blockage of the slide.

When dosing free-flowing bulk materials having a particle diameter in the range of 100-1000 µm, in particular in the case of spherical particles, using the known dosing dispenser, a new problem presents itself: as soon as particles make their way between the slide and the guide sleeve, they are destroyed by abrasion. It is shown in an exemplary manner in FIG. 6 how particles which have been destroyed in this manner may look. When particles which have been modified in such a manner are emitted from the dosing dispenser, this may lead to problems in the application of the formulation. The release profile of an active ingredient contained in the particles may be modified, or the oral intake of a particle which has been modified in its shape may lead to injury and to deposits in the oesophagus.

Therefore, particles of the formulation of a drug or nutritional supplement in the form of a free-flowing bulk material having a particle diameter in the range of 100-1000 µm must be prevented from being destroyed at all by way of abrasion and destroyed particles must be prevented from being ejected from the dosing dispenser.

The achievement of the object according to the invention lies in a dosing dispenser which is known per se having a specially designed slide—referred to in the following as a "dosing piston"—and in a dosing piston for the dosing dispenser which is known per se.

The dosing dispenser is composed of a housing including a storage chamber, the base of which displays an outlet opening, and a guide sleeve having a circular cross section, into which the outlet opening opens. The dosing piston according to the invention, which displays a dosing chamber, is displaceably disposed in the guide sleeve. The dosing piston is displaceable between a filling position, in which the dosing chamber is connected to the outlet opening in the storage chamber, and an ejection position, in which the dosing chamber is connected to the free space.

The dosing piston according to the invention is formed by two circular plates which are disposed in a spaced-apart and concentric manner on an axle. Proceeding from their outer circumference, at least one, preferably both plates, display/s an annular widening having an axial expansion into the side which is opposite in each case the other plate, wherein the outer diameter of the annular widening is larger than the diameter of the associated circular plate and is also larger than the inner diameter of the guide sleeve (oversize) into which the dosing piston can be inserted. The annular widening is composed of an elastic material. The annular widening is suited to an accurate fit on the inner wall of the guide sleeve. The annular widening is preferably composed of an elastic plastic material, for example high-density polyethylene (HDPE).

The axle of the dosing piston, in order to facilitate its actuation, is preferably connected to a pressure plate. In order to make possible multiple actuation of the dosing piston, the dosing dispenser may display a return spring which places the dosing piston from the ejection position back into the rest position (=filling position). The housing and the dosing piston of the dosing dispenser may have been manufactured from plastic in an injection-moulding process.

By way of the dosing piston according to the invention, during the displacement movement of the dosing piston in the guide sleeve, the particles are prevented from being destroyed by abrasion and/or from blocking the dosing piston. In the case of individual particles being pressed against the annular widening, the latter, on account of its elasticity, yields and the particles, in the intact state, make their way to the side of the annular widening that faces away from the dosing chamber.

In another embodiment of the dosing piston according to the invention, at least one of the two circular plates moreover has a cylindrical extension in the axial direction which is counter to the other plate. The outer diameter of the cylindrical extension, depending on the diameter of the particles for which the dosing dispenser is to be employed, is so much smaller than the inner diameter of the guide sleeve that particles which are located between the cylindrical extension and the inner wall of the guide sleeve are not comminuted. In this embodiment, the annular widening, composed of an elastic material, which has already been described above is arranged on the end of the cylindrical extension instead of directly on the circular plate.

In a further embodiment each cylindrical extension furthermore has, on its end, an annularly encircling region which has a larger outer diameter than the remaining regions of the cylindrical extension. This annular region forms an edge which, to the greatest extent possible, prevents entire or destroyed particles which have made their way into the region between the cylindrical extension and the inner wall of the guide sleeve from leaving the latter region again. Also in this embodiment, the annular widening, composed of an elastic material, which has already been described above, is arranged on the end of the cylindrical extension, beyond the annular widening, instead of directly on the circular plate.

At least that plate that faces the direction from which the dosing piston is actuated, for example by way of a pressure plate, preferably has the described cylindrical widening.

The cylindrical widening of that plate that faces the direction from which the dosing piston is actuated has a region which, when the dosing piston is being inserted into the guide sleeve, faces the outlet opening of the storage chamber. This region preferably has an outer diameter which corresponds to the inner diameter of the guide sleeve. On account thereof, particles from the storage chamber are prevented from accumulating in the regions of smaller inner diameter of the cylindrical extension when the dosing piston is located in the ejection position. In as far as this serves a purpose, for example in order to ensure higher stability of the dosing piston within the guide sleeve, individual regions of the cylindrical extension may have an outer diameter which corresponds to the inner diameter of the guide sleeve.

FIGURES AND EXAMPLES

Figure 2:
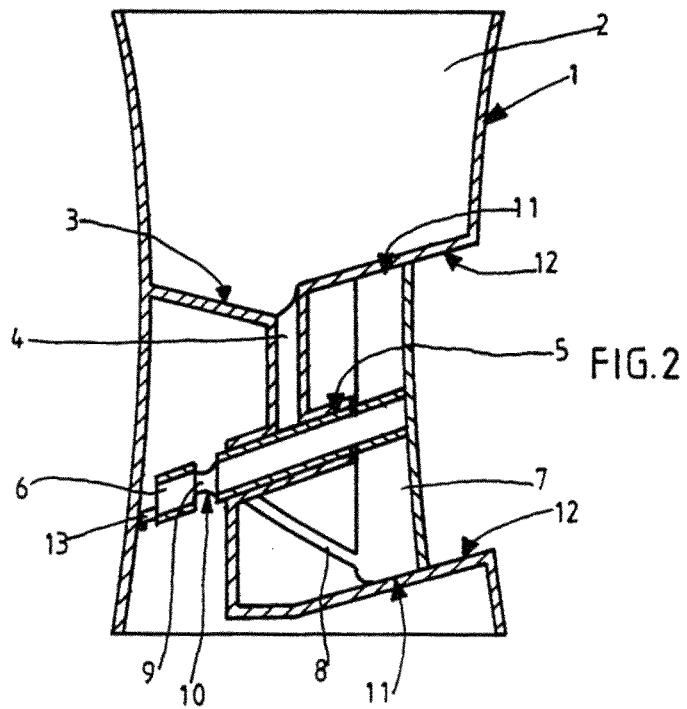
Figure 3:
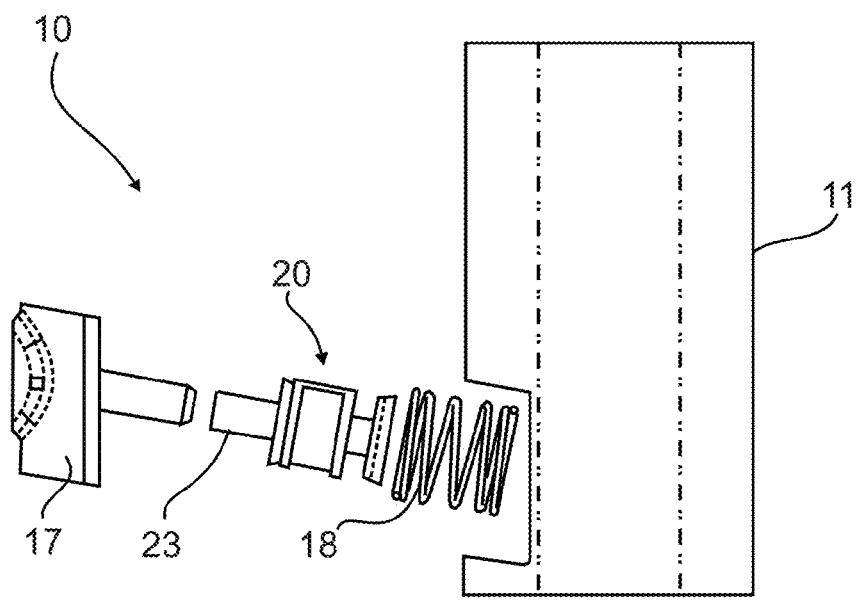
Figure 4:
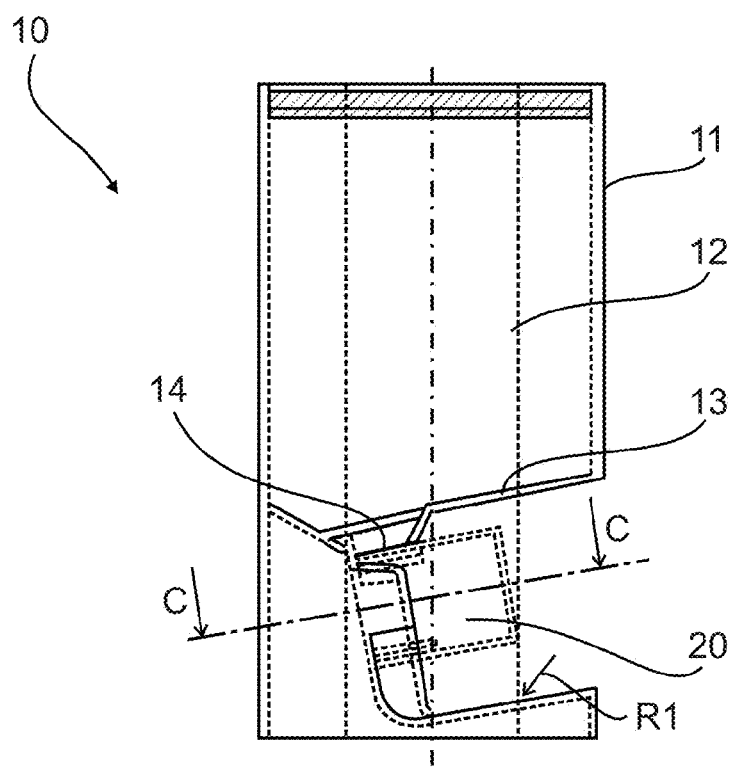
Figure 5:
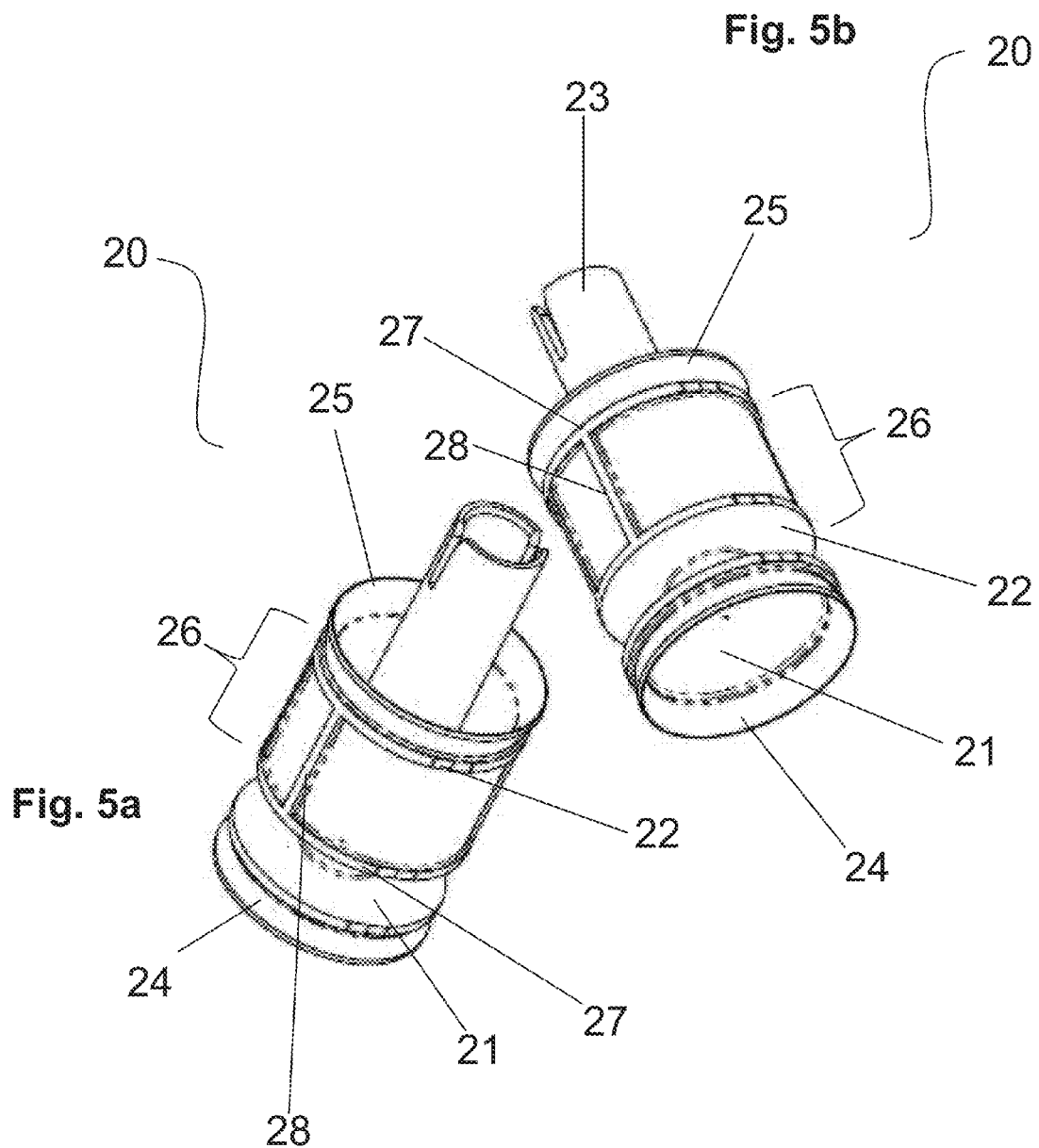
Figure 6:
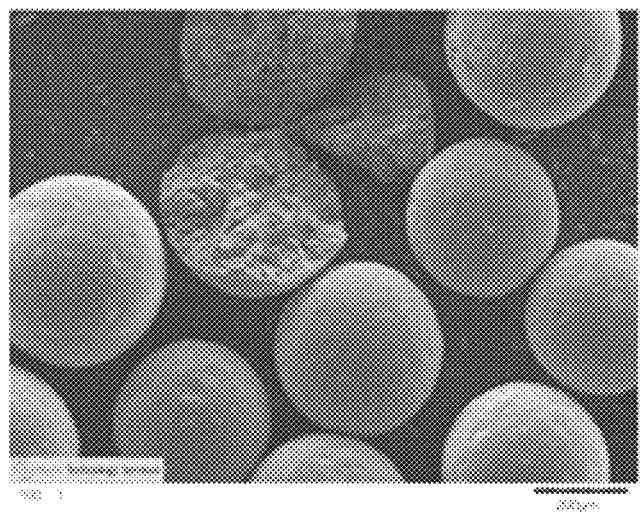

In the drawings:

FIG. 1 shows a dosing dispenser from the prior art, having the slide in the rest position, FIG. 2 shows a dosing dispenser from the prior art, having the slide in the ejection position, FIG. 3 shows a dosing dispenser having the dosing piston according to the invention, as an exploded drawing, FIG. 4 shows a dosing dispenser having the dosing piston according to the invention, in cross section, FIGS. 5a, 5b show the dosing piston according to the invention, in two perspectives, FIG. 6 shows destroyed and intact particles of a free-flowing bulk material of 200-400 μm diameter.

FIGS. 3 and 4 show the dosing dispenser 10 having the dosing piston 20 according to the invention, as an exploded drawing or in cross section, respectively. The dosing dispenser 10 is composed of a housing 11 which contains a storage chamber 12 for a formulation of drugs or nutritional supplements in the form of a free-flowing bulk material having a particle diameter in the range of 100-1000 μm, and the base 13 of said storage chamber 12 displaying an outlet opening 14. Furthermore located in the housing 11 is a guide sleeve for a dosing piston 20 which is connected to a pressure plate 17. The return spring 18 places the dosing piston 20 and the pressure plate 17 in their respective rest position (=filling position). The base 13 of the storage chamber 12 is tapered in a funnel-like manner in the region of the outlet opening 14. The guide sleeve for the dosing piston 20 has a circular cross section. In the rest position, the dosing chamber of the dosing piston 20 is filled from the storage chamber 12 via the outlet opening 14. Upon actuation of the pressure plate 17 which is connected to the axle 23 of the dosing piston 20, the outlet opening 14 is closed and the dosing piston 20 is pushed into the ejection position, such that the dosing chamber is opened and emptied. Both the housing 11 and the dosing piston 20 may be manufactured from plastic in an injection-moulding process.

FIGS. 5a and 5b show the dosing piston 20 according to the invention in two perspectives. The dosing piston 20 according to the invention is formed by two circular plates 21, 22 which are disposed in a spaced-apart and concentric manner on an axle 23. The outer diameter of the two plates 21, 22 preferably corresponds to the inner diameter of the guide sleeve of the dosing dispenser 10. The two plates 21, 22, proceeding from their outer circumference, each display an annular widening 24, 25 having an axial expansion into the side which is opposite in each case the other plate 21, 22, wherein the outer diameter of the annular widening 24, 25 is larger than the inner diameter of the guide sleeve (oversize) and the annular widening 24, 25 is composed of an elastic material. The plate 22 which, along the axle 23 of the dosing piston 20, is disposed closer to that side from which the dosing piston 20 is actuated, has a cylindrical extension 26 in the axial direction which is counter to the first plate 21. The outer diameter of the cylindrical extension 26, with the exception of a few regions, is smaller than the inner diameter of the guide sleeve, such that particles which are located between the cylindrical extension 26 and the inner wall of the guide sleeve are not comminuted. An annularly encircling region 27 which has a larger outer diameter than the remaining regions of the cylindrical extension is located on the end of the cylindrical extension. This encircling annular region 27 allows particles which are located in the region of the cylindrical extension 26 to stop there. The annular widening 25 is located on the end of the cylindrical extension 26, adjacent to the encircling annular region 27. A web-like region 28 which runs in the axial direction on the surface of the cylindrical extension 26 likewise has a larger outer diameter than the other regions of the cylindrical extension 26 and corresponds to the inner diameter of the guide sleeve.

The invention claimed is:

1. A dosing dispenser for dosing formulations of a drug or nutritional supplement in the form of a free-flowing bulk material having a particle diameter in the range of 100-1000 μm, composed of
   a housing including
      a storage chamber, the base of which displays an outlet opening,
      a guide sleeve having a circular cross section, into which the outlet opening opens,
      a dosing piston which is displaceably disposed in the guide sleeve and which has a dosing chamber which is displaceable between a filling position, in which the dosing chamber is connected to the outlet opening in the storage chamber, and an ejection position, in which the dosing chamber is connected to the free space,
   wherein
      the dosing piston displays two circular plates which are disposed in a spaced-apart and concentric manner on an axle, and, proceeding from its outer circumference, at least one of the two circular plates displays an annular widening having an axial expansion away from the at least one plate into the direction which is opposite in each case the other plate, wherein at least one of the two circular plates is located inside the guide sleeve, the outer diameter of the annular widening is larger than the inner diameter of the guide sleeve, the annular widening is composed of an elastic material, and the dosing chamber is formed by the inner wall of the guide sleeve and the two circular plates.

2. The dosing dispenser of claim 1, wherein both plates, proceeding from their outer circumference, display an annular widening having an axial expansion into the side which is opposite in each case the other plate.

3. The dosing dispenser of claim 1, wherein the annular widening is composed of high-density polyethylene (HDPE).

4. The dosing dispenser claim 1, wherein at least one of the plates has a cylindrical extension in the axial direction which is counter to the other plate.

5. The dosing dispenser of claim 4, wherein the plate which, along the axle of the dosing piston, is disposed closer to that side from which the dosing piston is actuated, has the cylindrical extension.

6. The dosing dispenser of claim 4, wherein the outer diameter of the cylindrical extension is smaller than the inner diameter of the guide sleeve.

7. The dosing dispenser of claim 5, wherein an annularly encircling region which has a larger outer diameter than the remaining regions of the cylindrical extension is located on the end of the cylindrical extension.

8. The dosing dispenser of claim 4, wherein the annular widening, composed of an elastic material, is located on the end of the cylindrical extension.

9. The dosing dispenser of claim 1, wherein the axle of the dosing piston is connected to a pressure plate.

10. The dosing dispenser of claim 1, wherein the dosing dispenser has a return spring which places the dosing piston in the filling position.

11. The dosing dispenser of claim 1, wherein the housing and the dosing piston are manufactured from plastic in an injection-moulding process.

12. A dosing piston for a dosing dispenser for dosing formulations of
   a drug or nutritional supplement in the form of a free-flowing bulk material having
   a particle diameter in the range of 100-1000 μm, displaying an axle,
   two circular plates which are disposed in a spaced-apart and concentric manner on the axle,
   proceeding from their outer circumference, at least one of the two circular plates which is located inside the guide sleeve in each position with relation the guide sleeve displays an annular widening having an axial expansion away from the at least one plate into the direction which is opposite in each case the other plate, wherein at least one of the two circular plates is located inside the guide sleeve, the outer diameter of the annular widening is larger than the diameter of the associated circular plate, and the annular widening is composed of an elastic material.

13. The dosing piston of claim 12, wherein both plates, proceeding from their outer circumference, display an annular widening having an axial expansion into the side which is opposite in each case the other plate.

14. The dosing piston of claim 12, characterized in that the annular widening is composed of low-density polyethylene (LDPE).

15. The dosing piston of claim 12, wherein at least one of the plates has a cylindrical extension in the axial direction which is counter to the other plate.

16. The dosing piston of claim 15, wherein the outer diameter of the cylindrical extension is smaller than the outer diameter of the circular plates.

17. The dosing piston of claim 12, wherein an annularly encircling region which has a larger outer diameter than the remaining regions of the cylindrical extension is located on the end of the cylindrical extension.

18. The dosing piston of claim 15, characterized in that the annular widening, composed of an elastic material, is located on the end of the cylindrical extension.

19. The dosing piston of claim 12, characterized in that an axially expanded region of the cylindrical extension has the same outer diameter as the two plates.

20. The dosing piston of claim 12, wherein the axle is connected to a pressure plate.

* * * * *